United States Patent
Visca et al.

(10) Patent No.: US 8,418,817 B2
(45) Date of Patent: Apr. 16, 2013

(54) BRAKE ASSEMBLY HAVING A MOUNTING CLIP

(75) Inventors: Michael A. Visca, Macomb Township, MI (US); Deepak R. Sheelvant, Bangalore (IN); Scott A. Jenkinson, Davisburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 72 days.

(21) Appl. No.: 13/171,997

(22) Filed: Jun. 29, 2011

(65) Prior Publication Data

US 2013/0001029 A1 Jan. 3, 2013

(51) Int. Cl.
 *F16D 65/12* (2006.01)
(52) U.S. Cl.
 USPC .................................. 188/218 XL; 188/18 A
(58) Field of Classification Search ............ 188/218 XL, 188/218 R, 17, 18 A, 18 R; 301/6.1, 6.8
 See application file for complete search history.

(56) References Cited

U.S. PATENT DOCUMENTS

| | | | |
|---|---|---|---|
| 6,267,210 B1 | 7/2001 | Burgoon et al. | |
| 6,467,588 B1 | 10/2002 | Baumgartner et al. | |
| 6,564,913 B2 | 5/2003 | Baumgartner et al. | |
| 6,604,613 B2 | 8/2003 | Burgoon et al. | |
| 6,997,292 B2 | 2/2006 | Burgoon et al. | |
| 7,028,816 B2 * | 4/2006 | Baumgartner et al. | . 188/218 XL |
| 7,077,247 B2 | 7/2006 | Burgoon et al. | |
| 7,918,322 B2 * | 4/2011 | Pahle | 188/18 A |
| 2008/0149435 A1 * | 6/2008 | Burgoon et al. | 188/73.31 |

FOREIGN PATENT DOCUMENTS

| | | |
|---|---|---|
| DE | 19807184 C1 | 4/2000 |
| WO | 0225135 A1 | 2/2002 |
| WO | 2008026990 A1 | 3/2008 |

OTHER PUBLICATIONS

Extended European Search Report; European Patent Office; Dec. 12, 2012.

* cited by examiner

*Primary Examiner* — Pamela Rodriguez
(74) *Attorney, Agent, or Firm* — Brooks Kushman P.C.

(57) ABSTRACT

A brake assembly having a hub, a rotor, and a mounting clip. The hub has a mounting boss and first and second pockets disposed on opposite sides of the mounting boss. The rotor is disposed on the hub and has a first tooth and a second tooth disposed in the first and second pockets, respectively. The mounting clip has a first arm that is disposed in the first pocket between the first tooth and the mounting boss and the second arm is disposed in the second pocket between the second tooth and the mounting boss.

20 Claims, 4 Drawing Sheets

BRAKE ASSEMBLY HAVING A MOUNTING CLIP

TECHNICAL FIELD

The present application relates to a brake assembly having a mounting clip.

BACKGROUND

A brake hub and rotor assembly is disclosed in U.S. Pat. No. 6,604,613.

SUMMARY

In at least one embodiment, a brake assembly is provided. The brake assembly may include a hub, a rotor, and a unitary mounting clip. The hub may have a mounting boss and first and second pockets disposed on opposite sides of the mounting boss. The rotor may be disposed on the hub and may include a first tooth and a second tooth. The first tooth may be disposed in the first pocket. The second tooth may be disposed in the second pocket. The mounting clip may have a first arm and a second arm that extend from opposite ends of a cross member. The first arm may be disposed in the first pocket between the first tooth and the mounting boss. The second arm may be disposed in the second pocket between the second tooth and the mounting boss.

In at least one embodiment, a brake assembly is provided. The brake assembly may include a hub, a rotor, a unitary mounting clip, and a fastener. The hub may include a center hole and a mounting boss. The mounting boss may be spaced apart from the center hole and may partially define first and second pockets that are disposed on opposite sides of the mounting boss. The rotor may have a first tooth and a second tooth that may engage the hub and may be disposed in the first and second pockets, respectively. The mounting clip may include a cross member, a first arm, and a second arm. The cross member may engage the mounting boss and may be spaced apart from the rotor. The first arm may have a bend portion that extends from a first end of the cross member. The second arm may have a bend portion that extends from a second end of the cross member disposed opposite the first end. The fastener may couple the mounting clip to the mounting boss. The bend portion of the first arm may engage the first tooth. The bend portion of the second arm may engage the second tooth. The first arm may be disposed in the first pocket and may engage the first tooth and the mounting boss. The second arm may be disposed in the second pocket and may engage the second tooth and the mounting boss.

In at least one embodiment, a brake assembly is provided. The brake assembly may include a hub, a rotor, a mounting clip, and a fastener. The hub may have a mounting boss and first and second pockets disposed on opposite sides of the mounting boss. The mounting boss may have a first surface that defines a mounting hole. The rotor may have an opening that receives the hub. The rotor may also have a first tooth and a second tooth disposed in the first and second pockets, respectively. The mounting clip may have first and second arms that extend from opposite ends of a cross member. The cross member may engage the first surface and may be spaced apart from the rotor. The fastener may extend through the mounting clip and engage the mounting hole. The first arm may have first and second elongate portions that are disposed in the first pocket. The first elongate portion may engage the mounting boss and may be spaced apart from the rotor. The second elongate portion may engage the first tooth and may be spaced apart from the hub.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
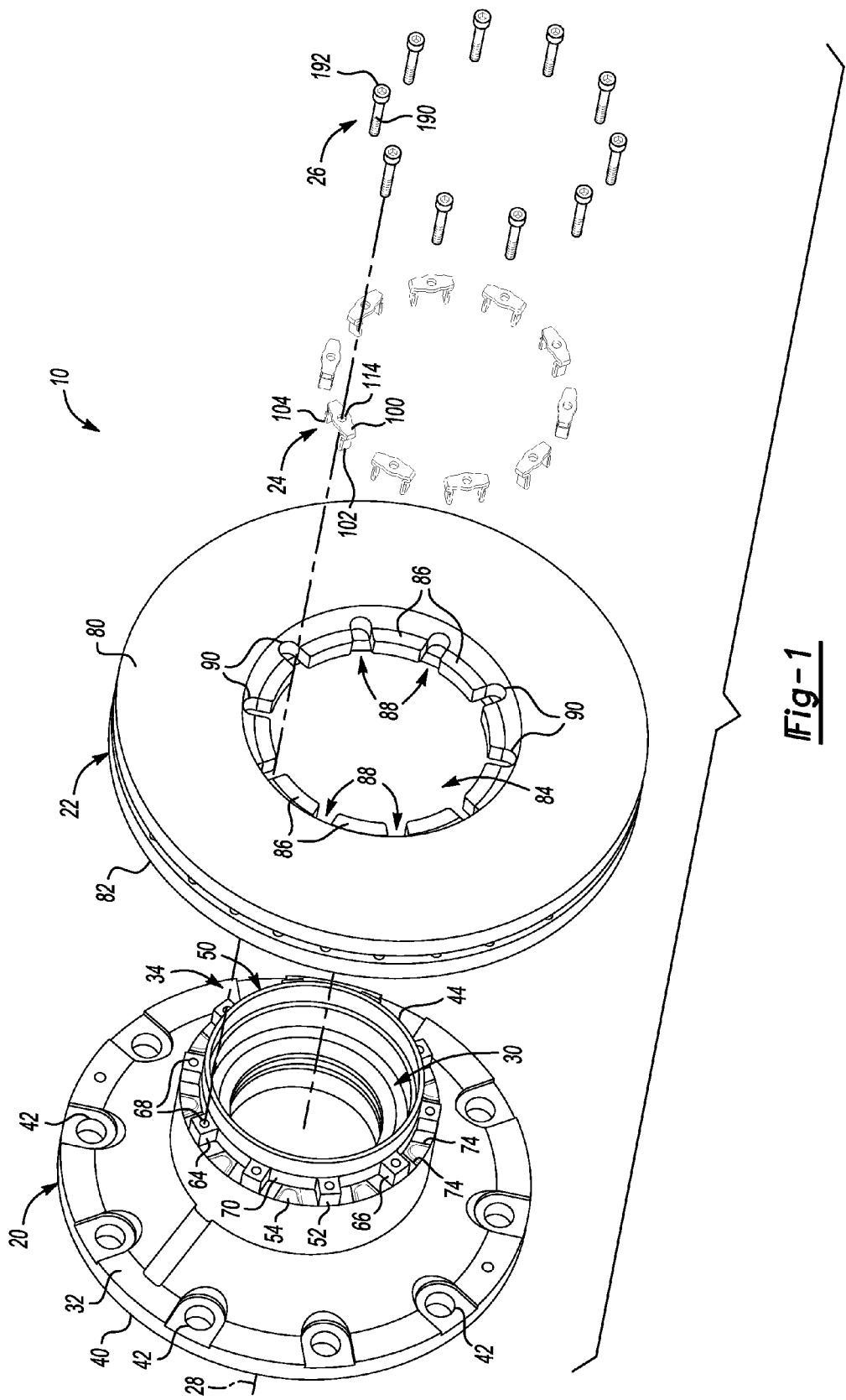
FIG. 1 is an exploded view of an exemplary brake assembly.

Referring to FIG. 1, an exemplary embodiment of a brake assembly 10 is shown. The brake assembly 10 may be provided with a motor vehicle, such as an automobile, truck, or motorcycle. The brake assembly 10 may include a hub 20, a rotor 22, a plurality of mounting clips 24, and a plurality of fasteners 26.

The hub 20 may facilitate coupling of a wheel and an axle. In addition, the hub 20 may provide a structure for mounting the rotor 22, mounting clip 24, and fastener 26 as will be described in more detail below. The hub 20 may be a cast component that may be made of any suitable material, such as an aluminum alloy. The hub 20 may be disposed about a center axis 28 and may include a center hole 30, a flange 32, and a rotor mounting portion 34.

The center hole 30 may be configured to receive or facilitate mounting to an axle. The center hole 30 may extend through the hub 20 and may be disposed along the center axis 28.

The flange 32 may be disposed at a first end 40 of the hub 20. The flange 32 may extend radially outward from the center axis 28 and may be disposed around the center hole 30. The flange 32 may have a larger diameter than the rotor mounting portion 34. In addition, the flange 32 may include a plurality of holes 42 that facilitate mounting of a wheel to the hub 20. Each hole 42 may be disposed along an axis that extends substantially parallel to the center axis 28. A fastener, such as a mounting stud or lug bolt, may be disposed in each hole 42 to facilitate mounting of the wheel.

The rotor mounting portion 34 may be integrally formed with the flange 32. The rotor mounting portion 34 may be disposed at a second end 44 of the hub 20 that is disposed opposite the first end 40. The rotor mounting portion 34 may be disposed around the center hole 30 and may include a collar 50, a set of mounting bosses 52, and a set of pockets 54.

The collar 50 may extend from the second end 44 of the hub 20 toward the first end 40. More specifically, the collar 50 may extend from the second end 44 to the set of mounting bosses 52. The collar 50 may have a generally cylindrical outside diameter surface.

The set of mounting bosses 52 may be disposed between the collar 50 and the flange 32. Each member of the set of mounting bosses 52 may be spaced apart from every other member of the set such that a member of the set of pockets 54 is disposed between adjacent mounting bosses 52. As such, each mounting boss 52 may be disposed radially about the center hole 30, or along different radii that extend from the center axis 28. Moreover, each member of the set of mounting bosses 52 may be arranged with substantially equal spacing such that each mounting boss 52 is spaced apart from an adjacent mounting boss 52 by approximately the same amount or angular distance. In the embodiment shown, ten mounting bosses 52 are provided; however, a greater or lesser number of mounting bosses may be provided in various other embodiments.

Each member of the set of mounting bosses 52 may have the same or a similar configuration. For example, each member of the set of mounting bosses 52 may extend outward from the center axis 28 such that each mounting boss 52 extends further away from the center axis 28 than the collar 50. Each mounting boss 52 may include a first surface 60, a second surface 62, a third surface 64, and a fourth surface 66.

The first surface 60 may face toward the second end 44 of the hub 20 and may extend substantially perpendicular to the center axis 28. A mounting hole 68 may extend through the first surface 60. The mounting hole 68 may be a blind hole and may include one or more threads that mate with threads on the fastener 26.

The second surface 62 may extend from the first surface 60 toward the first end 40 of the hub 20. In at least one embodiment, the second surface 62 may extend substantially perpendicular with respect to the first surface 60. The second surface 62 or a portion thereof may be curved or planar in one or more embodiments.

The third and fourth surfaces 64, 66 may extend from the first surface 60 and the second surface 62 along opposite sides of the mounting boss 52. The third and fourth surfaces 64, 66 may extend from the first surface 60 toward the first end 40 of the hub 20. In at least one embodiment, the third and fourth surfaces 64, 66 may be disposed substantially parallel to each other. In addition, the third and fourth surfaces 64, 66 may be disposed substantially perpendicular to at least a portion of the first and/or second surfaces 60, 62.

Each member of the set of pockets 54 may be disposed between adjacent mounting bosses 52. Each pocket 54 may be at least partially defined by a surface of a mounting boss 52. For instance, a pocket 54 may be partially defined by the third surface 64 of one mounting boss 52 and the fourth surface 66 of an adjacent mounting boss 52. In addition, each member of the set of pockets 54 may be at least partially defined by a lower surface 70 and a back surface 72.

The lower surface 70 may extend along the bottom of a pocket 54 between two adjacent mounting bosses 52. More specifically, the lower surface 70 may extend from the third surface 64 of one mounting boss 52 to the fourth surface 66 of an adjacent mounting boss 52. In at least one embodiment, at least a portion of the lower surface 70 may extend generally parallel to the center axis 28 and may be substantially planar. As such, a pocket 54 may have a generally trapezoidal shape when viewed along the center axis 28.

The back surface 72 may extend along a back side of the pocket 54 that is disposed closer to the first end 40 than the first surface 60 is disposed to the first end 40. The back surface 72 may extend from the third surface 64 of one mounting boss 52 to the fourth surface 66 of an adjacent mounting boss 52. In addition, at least a portion of the back surface 72 may extend substantially perpendicular to the center axis 28 and the lower surface 70. In one or more embodiments, the back surface 72 may be substantially planar and may include a recess 74 that extends toward the first end 40 of the hub 20.

The rotor 22, which may also be called a brake disc, may be provided for slowing or stopping rotation of a wheel that may be coupled to the brake assembly 10. The rotor 22 may be centered about the center axis 28 when assembled to the hub 20. The rotor 22 may be configured as a generally circular disk and may include a first braking surface 80, a second braking surface 82, an opening 84, and a set of teeth 86.

The first braking surface 80 may be disposed opposite the second braking surface 82. The first and second braking surfaces 80, 82 may be disposed in substantially parallel planes and may be engaged by corresponding brake pads that may be mounted on a brake caliper assembly. The brake caliper assembly may mechanically, pneumatically, or hydraulically actuate the brake pads into engagement with the first and second braking surfaces 80, 82 to produce friction that slows or stops rotation of the rotor 22 and an associated wheel. The rotor 22 may be made of any suitable material, such as cast iron, reinforced carbon-carbon, or a ceramic composite material. As such, the rotor 22 may be made of a different material than the hub 20 in one or more embodiments. The rotor 22 may be ventilated to help dissipate heat generated during braking. In the embodiment shown, the rotor 22 includes a plurality of apertures disposed between the first and second braking surfaces 80, 82. Apertures may also be provided in the first and second braking surfaces 80, 82 in one or more embodiments.

The set of teeth 86 may extend into the opening 84 and toward the center axis 28. In the embodiment shown, ten teeth 86 are provided; however, a greater or lesser number of teeth may be provided in other embodiments. Each member of the set of teeth 86 may be generally disposed between the first and second braking surfaces 80, 82 or planes in which these surfaces are disposed. Optionally, one or more teeth 86 may be disposed or extend beyond the first and/or second braking surfaces 80, 82. In addition, each member of the set of teeth 86 may be spaced apart from other members of the set such that a cavity 88 is provided between adjacent teeth 86. A connecting surface 90 may at least partially define each cavity 88 and may extend between surfaces of adjacent teeth 86 that partially define a particular cavity 88. The connecting surface 90 may be curved in one or more embodiments and may be spaced apart from an adjacent mounting boss 52. Each cavity 88 may receive a corresponding mounting boss 52 while each tooth 86 may be disposed in a corresponding pocket 54 when the rotor 22 is assembled to the hub 20. Each tooth 86 may be spaced apart from an adjacent tooth 86 by approximately the same amount or angular distance.

Figure 2:
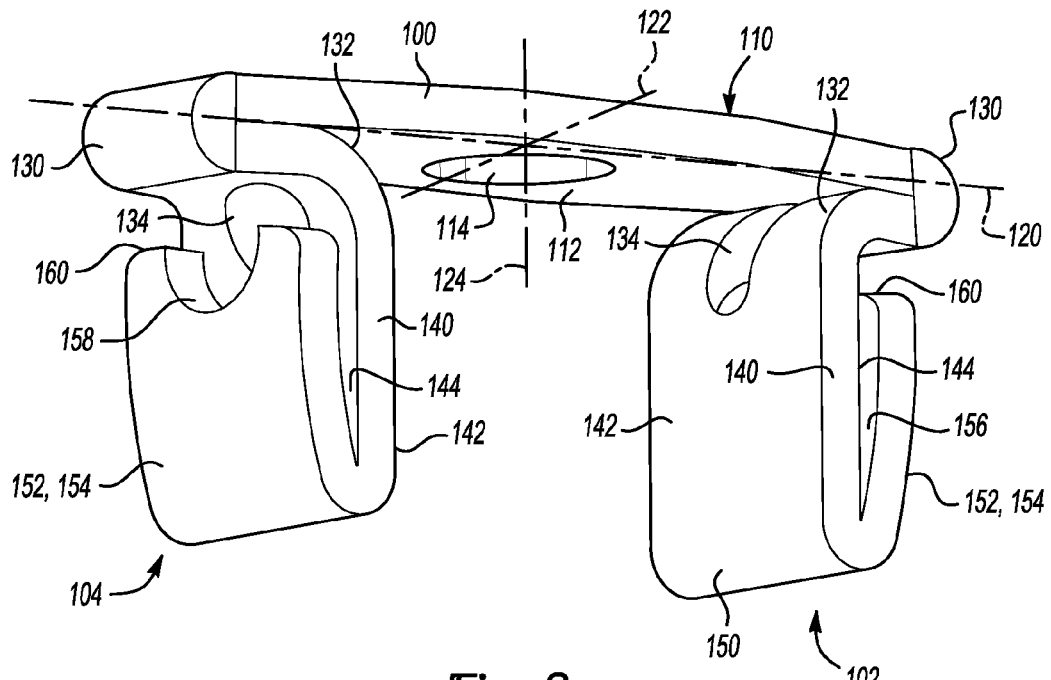
FIGS. 2-6 are perspective views of various embodiments of mounting clips that may be provided with the brake assembly.

Referring to FIG. 2, a first embodiment of a mounting clip 24 is shown. The mounting clip 24 may be used to help position and secure the rotor 22 to the hub 20. In addition, the mounting clip 24 may accommodate thermal expansion of the rotor 22 with respect to the hub 20 as will be discussed in more detail below. The mounting clip 24 may be a unitary or one-piece component. The mounting clip may be a stamped part that may be made of any suitable material, such as a metal alloy. The mounting clip 24 may include a cross member 100, a first arm 102, and a second arm 104.

The cross member 100 may include a first surface 110 and a second surface 112 disposed opposite the first surface 110. In at least one embodiment, the cross member 100 may be substantially planar. A through hole 114 may extend through the cross member 100 from the first surface 110 to the second surface 112. The through hole 114 may be disposed in substantially the center of the cross member 100. The cross member 100 may also be symmetrical with respect to a first axis 120 and a second axis 122 that extends perpendicular to the first axis 120. The first and second axes 120, 122 may intersect at the center of the through hole 114. In addition, a third axis 124 may extend substantially perpendicular to the first and second axes 120, 122. The third axis 124 may be a center axis of the through hole 114.

The first arm 102 and second arm 104 may extend from opposite ends of the cross member 100. The first and second arms 102, 104 may be formed by bending material that extends from the ends of the cross member 100 in multiple directions. For instance, the first and second arms 102, 104 may include a first bend portion or first bend 130 at which material is bent back toward the third axis 124. As such, the first bend 130 may be folded to engage the second surface 112 of the cross member 100. In the embodiment shown, the first bend 130 has a fold angle of about 180 degrees.

The first and second arms 102, 104 may also include a second bend portion or second bend 132. The second bend 132 may begin at or near an end of the first bend 130 and extend away from the second surface 112 of the cross member 100. In at least one embodiment, the second bend 132 may have an angle of about 90 degrees. A dart 134 may be provided at or along a portion of the second bend 132. The dart 134 may help provide reinforcement for the first and second arms 102, 104 to inhibit bending or buckling. The dart 134 may be at least partially provided in a plane that includes the first and third axes 120, 124. More specifically, the dart 134 may be provided by deforming material located near the center of the second bend 132 in a direction that extends away from the second surface 112 of the cross member 100 and away from the third axis 124. Thus, the second bend 132 may include a generally arcuate curved surface above and below the dart 134 in one or more embodiments.

A first elongate portion 140 may extend from the second bend 132. The first elongate portion 140 may be generally planar and may be disposed generally perpendicular to the cross member 100 in one or more embodiments. The first elongate portion 140 may include an inner surface 142 that may engage the mounting boss 52 and an outer surface 144 disposed opposite the inner surface 142.

A third bend 150 may be disposed at an end of the first elongate portion 140. At the third bend 150, each arm 102, 104 may be bent back toward the cross member 100. A second elongate portion 152 may extend from an end of the third bend 150. The second elongate portion 152 may include an outer surface 154 that may engage a tooth 86 and an inner surface 156 disposed opposite the outer surface 154. Prior to installation, the third bend 150 may be configured such that the first and second elongate portions 140, 152 are spaced apart and the second elongate portion 152 extends generally toward the first bend 130. As such, the outer surface 144 may be spaced apart from the inner surface 156.

The second elongate portion 152 may include a cutout 158 disposed at a distal end 160. The cutout 158 may provide clearance so that the second elongate portion 152 does not engage the dart 134 and inhibit installation of the mounting clip 24. In the embodiment shown, the cutout 158 has a generally semicircular configuration.

Figure 3:
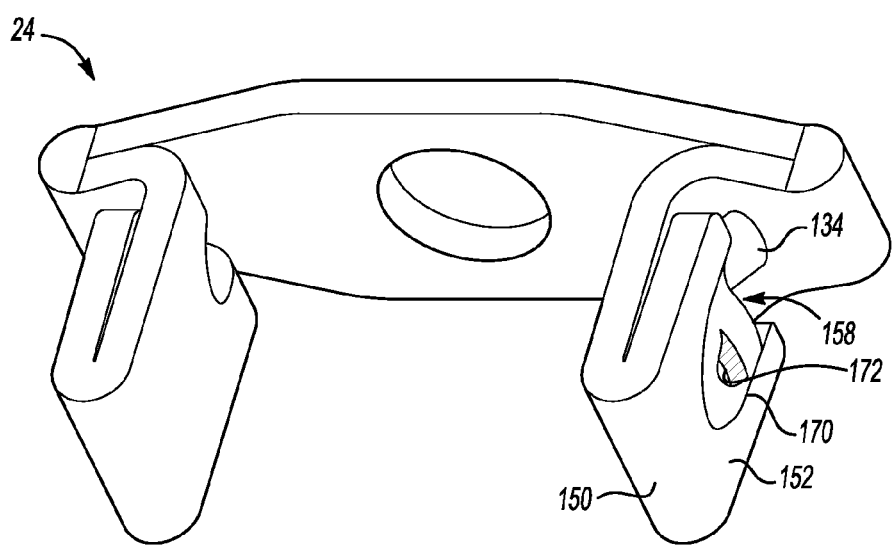
Figure 4:
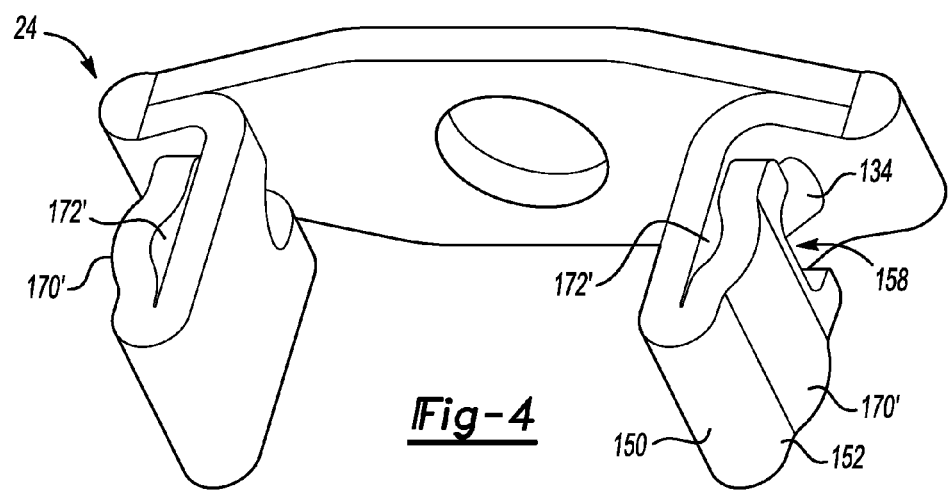
Figure 5:
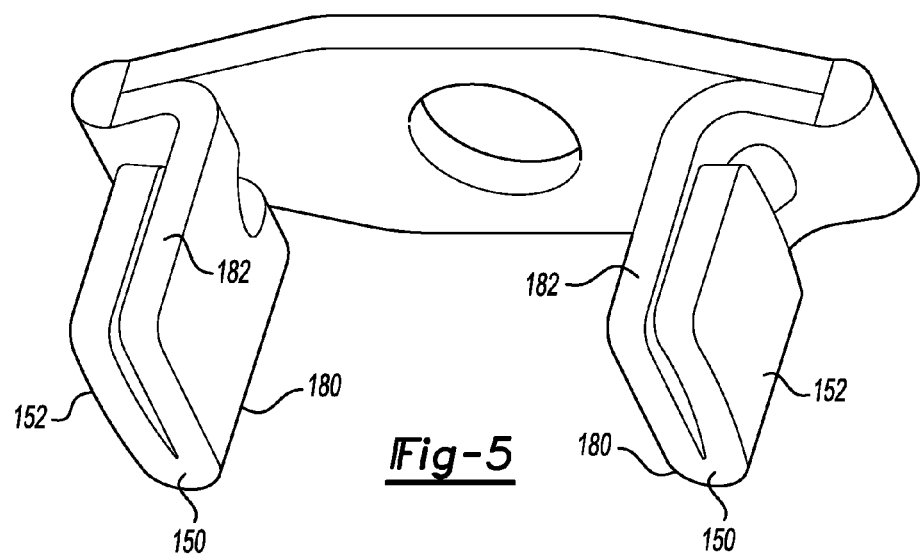

Referring to FIGS. 3-5, additional embodiments of the mounting clip are shown.

In FIG. 3, the mounting clip 24 is similar to the embodiment shown in FIG. 2 except for the addition of a protrusion 170 on the second elongate portion 152. The protrusion 170 may extend from the cutout 158 toward the third bend 150. The mounting clip is partially fragmented to show a cavity 172 that may be formed along the inner surface 156 opposite the protrusion 170. The protrusion 170 may provide additional clearance with respect to the dart 134 and/or may help resist disengagement of the mounting clip.

In FIG. 4, the mounting clip 24 is similar to the embodiment shown in FIG. 2 except for the addition of a protrusion 170' on the second elongate portion 152. The protrusion 170' may be disposed between the cutout 158 and the third bend 150 and may extend generally from a top surface to a bottom surface of the second elongate portion 152. A cavity 172' may be formed along the inner surface 156 opposite the protrusion 170' to help resist disengagement of the mounting clip.

In FIG. 5, the mounting clip 24 is similar to the embodiment shown in FIG. 2 except for the position of the third bend 150. In this embodiment, the third bend 150 is disposed along a bottom surface 180 of the first elongate portion 140 such that the second elongate portion 152 extends generally toward a top surface 182 disposed opposite the bottom side surface 180. As such, the second elongate portion 152 may extend generally in the same direction as the second axis 122.

Figure 6:
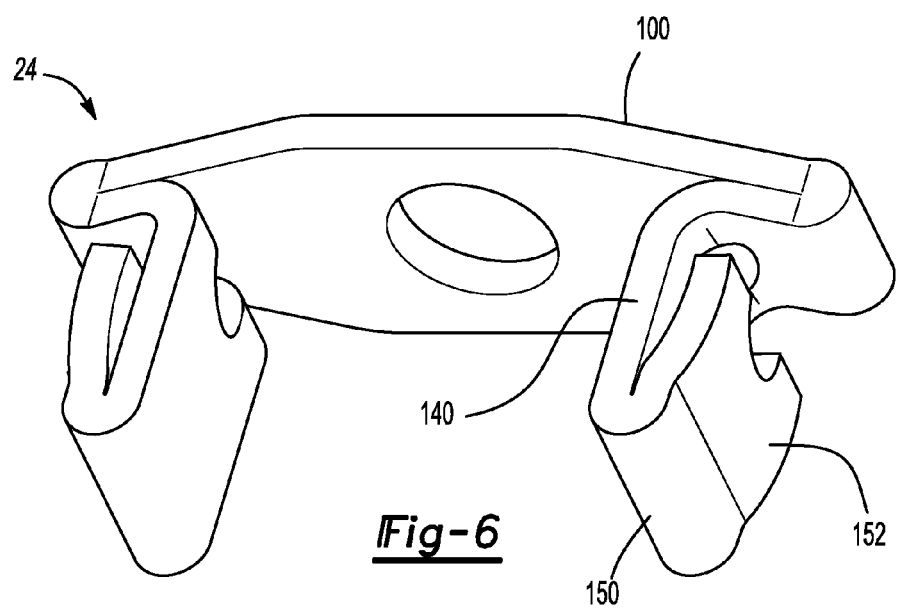

In FIG. 6, the mounting clip 24 is similar to the embodiment in FIG. 2 except that the first and second elongate portions 140, 152 engage each other near the third bend 150 and then become spaced apart as the second elongate portion 152 extends towards the cross member 100.

Referring again to FIG. 1, the fastener 26 may be provided to couple the mounting clip 24 to the hub 20. The fastener 26 may have any suitable configuration. For example, the fastener 26 may be configured as a threaded fastener, such as a bolt, in one or more embodiments. In the embodiment shown, the fastener 26 includes a shank 190 and a head 192 that may generally extend along the third axis 124 when assembled to the hub 20. The shank 190 may be at least partially threaded and may extend through the through hole 114 in the mounting clip 24 and engage the mounting hole 68 in a mounting boss 52. The head 192 may be disposed at an end of the shank 190 and may be larger than the through hole 114 in the mounting clip 24. The head 192 may include a bearing surface that engages the mounting clip 24 to apply force against the mounting clip 24 to inhibit disengagement of the mounting clip 24.

Figure 7:
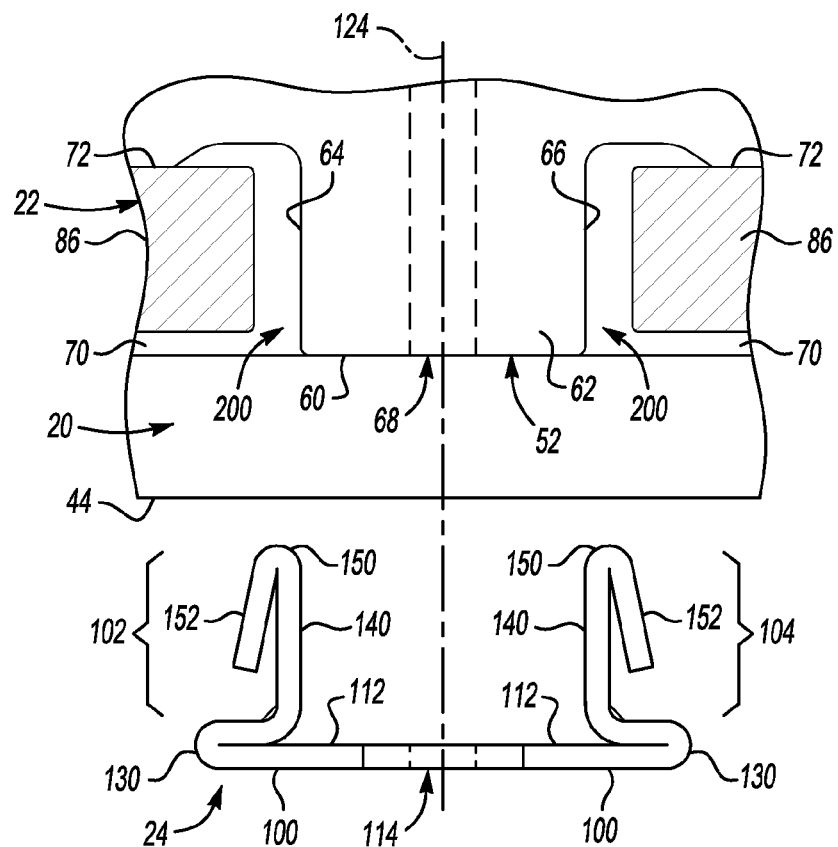
FIG. 7 is a section view of the brake assembly showing a mounting clip prior to installation.
Figure 8:
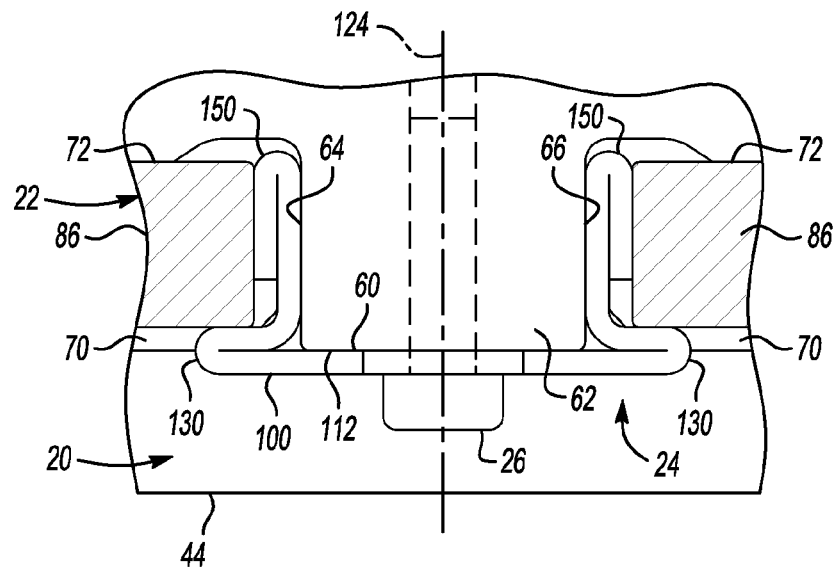
FIG. 8 is a section view of the brake assembly of FIG. 6 showing the mounting clip after installation.

Referring to FIGS. 7 and 8, an exemplary section view of a portion of the brake assembly 10 is shown. In FIGS. 7 and 8, the rotor 22 is shown disposed on the hub 20 such that each member of the set of teeth 86 engages the back surface 72 of a corresponding member of the set of pockets 54. In addition, each member of the set of teeth 86 is positioned such that a gap 200 is formed between the tooth 86 and each adjacent mounting boss 52. Although the mounting clip 24 of FIG. 2 is shown, it is contemplated that other embodiments of the mounting clip 24 as described above may also be employed.

In FIG. 7, the mounting clip 24 is shown prior to assembly. Prior to assembly, the second elongate portion 152 may be spaced apart from the first elongate portion 140. The distance between the first and second elongate portions 140, 152 may exceed the width of the gap 200 between the tooth 86 and the mounting boss 52. To assemble the mounting clip 24, each arm 102, 104 is aligned and inserted into a corresponding gap 200.

In FIG. 8, the mounting clip 24 is shown in an installed position with the fastener 26 disposed in the through hole 114 in the mounting clip 24 and the mounting hole 68 in a mounting boss 52 as previously described. During installation of the mounting clip 24, the second elongate portion 152 may bend toward the first elongate portion 140 due to the narrow width of the gap 200. The inner surface 156 may then engage the outer surface 144, the third bend 150 may have a bend angle of about 180 degrees. The first and second arms 102, 104 may inhibit rotation of the mounting clip 24 when installed.

In addition, the second surface 112 of the cross member 100 may engage the first surface 60 of the mounting boss 52 and the first bend 130 may engage a surface of a tooth 86 to hold the rotor 22 against the hub 20 and inhibit movement of rotor 22 along the third axis 124. The third bend 150 may also be spaced apart from the back surface 72 on the hub 20 so as to not interfere with insertion of the mounting clip 24. The first and second arms 102, 104 may be spaced apart from the lower surface 70 and/or the connecting surface 90 to permit the rotor 22 to expand or move in a radial direction with respect to the center axis 28 to accommodate relative thermal expansion and contraction while maintaining attachment of the rotor 22 to the hub 20. Such relative thermal expansion may be due at least in part to dissimilar materials used to make the hub 20 and rotor 22.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
    a hub having a mounting boss and first and second pockets disposed on opposite sides of the mounting boss;
    a rotor disposed on the hub, the rotor having a first tooth and a second tooth disposed in the first and second pockets, respectively; and
    a unitary mounting clip having a first arm and a second arm that extend from opposite ends of a cross member;
    wherein the first arm is disposed in the first pocket between the first tooth and the mounting boss and the second arm is disposed in the second pocket between the second tooth and the mounting boss and wherein the first arm has a first bend portion that extends from a first end of the cross member and a second bend portion that is spaced apart from the first bend portion, wherein the first arm engages the cross member between the first and second bend portions.

2. The brake assembly of claim 1 wherein the mounting boss includes a mounting hole and the mounting clip includes a through hole, a fastener extends through the mounting hole and into the through hole to secure the mounting clip to the hub.

3. The brake assembly of claim 2 wherein the cross member engages a first surface of the mounting boss that extends from the first pocket to the second pocket, wherein the mounting hole has a substantially circular opening that is completely defined within the first surface.

4. The brake assembly of claim 1 wherein the first pocket includes a lower surface and a back surface that extends from the lower surface, wherein the lower and back surfaces extend from the mounting boss to a second mounting boss and the first tooth engages the lower and back surfaces.

5. The brake assembly of claim 4 wherein the mounting clip is spaced apart from the lower and back surfaces.

6. The brake assembly of claim 1 wherein the first arm includes first and second elongate portions that are at least partially spaced apart before the first arm is inserted into the first pocket.

7. The brake assembly of claim 6 wherein the first and second elongate portions are biased into engagement when the first arm is inserted into the first pocket between the first tooth and the mounting boss.

8. A brake assembly comprising:
    a hub having a center hole, a mounting boss that is spaced apart from the center hole and that at least partially defines first and second pockets that are disposed on opposite sides of the mounting boss;
    a rotor having a first tooth and a second tooth that engage the hub and are disposed in the first and second pockets, respectively;
    a unitary mounting clip including:
        a cross member that engages the mounting boss and is spaced apart from the rotor;
        a first arm having a bend portion that extends from a first end of the cross member, a second bend portion that is spaced apart from the bend portion of the first arm, and a first elongate portion that extends from the second bend portion and away from the cross member; and
        a second arm having a bend portion that extends from a second end of the cross member disposed opposite the first end; and
    a fastener that couples the mounting clip to the mounting boss;
    wherein the bend portion of the first arm engages the first tooth, the bend portion of the second arm engages the second tooth, the first arm is disposed in the first pocket and engages the first tooth and the mounting boss, and the second arm is disposed in the second pocket and engages the second tooth and the mounting boss.

9. The brake assembly of claim 8 wherein the second arm includes a second bend portion that is spaced apart from the bend portion of the second arm and a first elongate portion that extends from the second bend portion of the second arm and away from the cross member.

10. The brake assembly of claim 8 wherein the first arm includes a third bend portion disposed at an end of the first elongate portion that is disposed opposite the second bend portion and a second elongate portion that extends from the third bend portion toward the cross member.

11. The brake assembly of claim 8 wherein the first elongate portion includes a dart disposed proximate the cross member.

12. The brake assembly of claim 11 wherein the dart is disposed at the second bend portion.

13. The brake assembly of claim 11 further comprising a second elongate portion that extends from the second bend portion, wherein the second elongate portion includes a cutout disposed at a distal end that receives the dart.

14. A brake assembly comprising:
    a hub that includes:
        a mounting boss having a first surface that defines a mounting hole; and
        first and second pockets disposed on opposite sides of the mounting boss;
    a rotor having an opening that receives the hub and a first tooth and a second tooth disposed in the first and second pockets, respectively;
    a mounting clip having a first arm and a second arm that extend from opposite ends of a cross member; and
    a fastener that extends through the mounting clip and engages the mounting hole;
    wherein the cross member engages the first surface and is spaced apart from the rotor; and wherein the first arm has first and second elongate portions that are disposed in the first pocket, wherein the first elongate portion engages the mounting boss and is spaced apart from the rotor and the second elongate portion engages the first tooth and is spaced apart from the hub.

15. The brake assembly of claim 14 wherein the second arm has a first elongate portion and a second elongate portion that are disposed in the second pocket, wherein the first elongate portion of the second arm engages the mounting boss and is spaced apart from the rotor and the second elongate portion of the second arm engages the second tooth and is spaced apart from the hub.

16. The brake assembly of claim 14 wherein the second elongate portion includes a protrusion and a cavity disposed between the protrusion and the first elongate portion.

17. The brake assembly of claim 16 wherein the protrusion and the cavity extend from a distal end of the second elongate portion away from the cross member.

18. The brake assembly of claim 16 wherein the protrusion and the cavity are spaced apart from a distal end of the second elongate portion.

19. The brake assembly of claim 16 wherein the first and second elongate portions extend from a bend and are disposed such that the first elongate portion engages the second elongate portion.

20. The brake assembly of claim 19 wherein the bend is disposed opposite a distal end of the second elongate portion.

* * * * *